Feb. 22, 1938.     C. S. BRAGG ET AL     2,109,099
CLUTCH CONTROL MECHANISM
Filed May 15, 1931      2 Sheets-Sheet 1
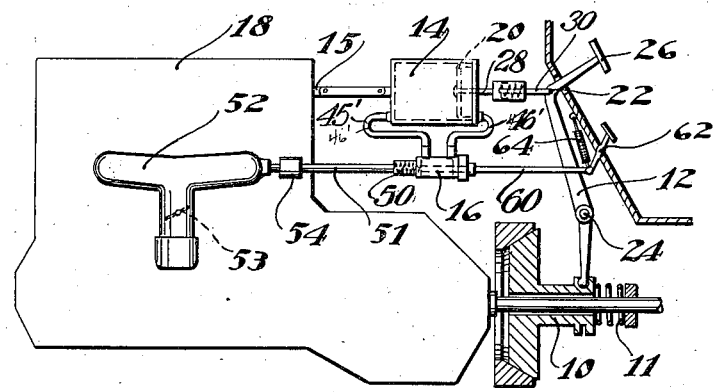
Fig. 1
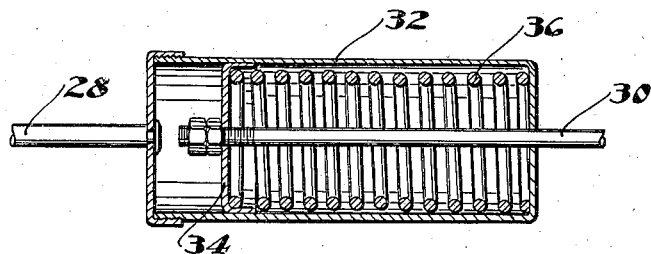
Fig. 2
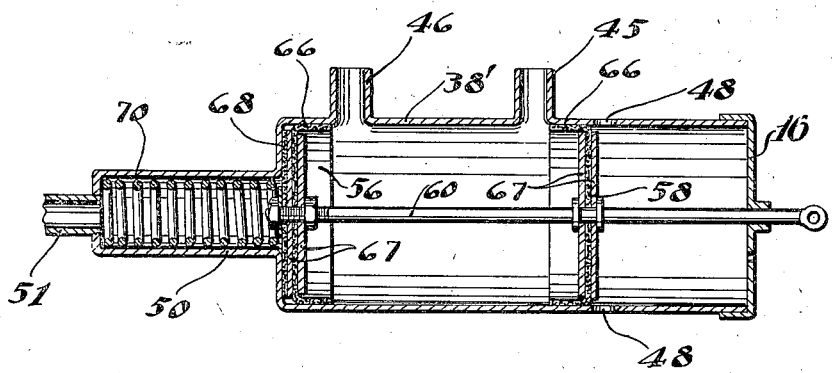
Fig. 3
Fig. 1ª
INVENTORS.
CALEB S. BRAGG
VICTOR W. KLIESRATH
BY H. O. Clayton
ATTORNEY Feb. 22, 1938.    C. S. BRAGG ET AL    2,109,099
CLUTCH CONTROL MECHANISM
Filed May 15, 1931    2 Sheets-Sheet 2
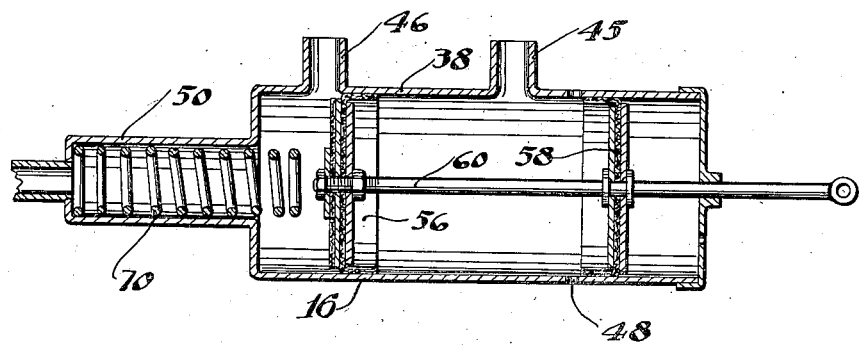
Fig. 4
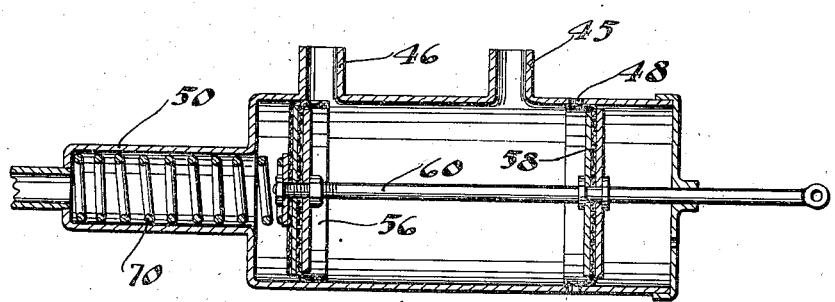
Fig. 5
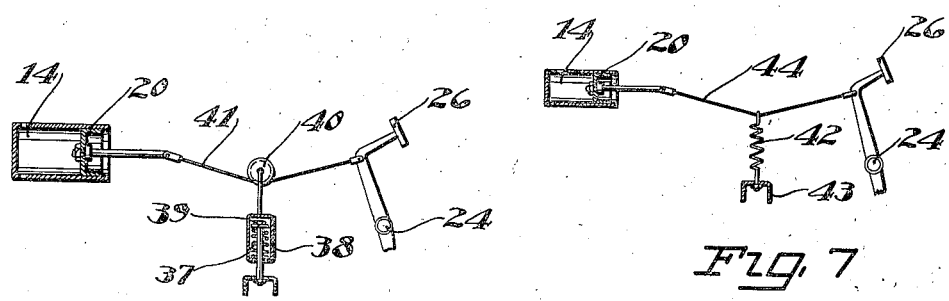
Fig. 6
Fig. 7
INVENTORS.
CALEB S. BRAGG
VICTOR W. KLIESRATH
BY
ATTORNEY Patented Feb. 22, 1938

2,109,099

UNITED STATES PATENT OFFICE 2,109,099

CLUTCH CONTROL MECHANISM

Caleb S. Bragg, Palm Beach, Fla., and Victor W. Kliesrath, Port Washington, N. Y., assignors to Bragg-Kliesrath Corporation, Long Island City, N. Y., a corporation of New York Application May 15, 1931, Serial No. 537,650

17 Claims. (Cl. 192—91)

This invention relates to power actuating mechanism and is illustrated as embodied in a fluid motor constructed and arranged to control the engagement and disengagement of the automotive clutch mechanism. The principal object of the invention is to as nearly as possible simulate the usual manual clutch control and to effect this control with a minimum of effort.

The increasing weight of the modern automotive bus and truck, with the corresponding increase in horsepower of their motors, necessarily increases the clutch spring load to keep the clutch plates engaged. The muscular effort of the driver in disengaging and engaging the clutch is therefore quite appreciable and this is particularly true with the long time intervals of clutch disengagement made necessary by the stop light traffic control now in vogue. It is obvious therefore, that the particular clutch control of this invention satisfies a much needed want in the operation of the modern bus and truck.

A further object of the invention is to provide a valvular mechanism for the power motor or actuator, which mechanism is so constructed and arranged as to give the much desired so-called "feel", that is, to apprise the driver at all times during the engagement and disengagement of the clutch, of the degree of effort exerted by the power actuator as well as the approximate time of engagement and disengagement of the clutch plates, the valve being controlled by a manually operable control lever which preferably has a limited movement and is easily operated, similar to the accelerator pedal, without the necessity of removing the heel from the floor board.

It is a further object of the invention to provide a quick-acting servo motor which will permit the clutch to engage instantly after shifting the running gears; i. e. from high to a lower speed or vice versa.

A further aspect of the invention contemplates an automatically controlled clutch engagement by the cooperation of the aforementioned servo motor with a yielding connection between the movable or piston element of the motor and the element for normally operating the clutch such as the usual clutch lever.

In the attainment of the above objects, there is suggested the aforementioned vacuum controlling valve which is arranged to energize and de-energize a double-ended fluid motor, the piston driving element of the latter being yieldably connected to the clutch pedal through the intermediary of a spring in series with these elements to thereby effect a disengagement of the clutch and also effectively and smoothly engage the same.

A further object of the invention resides in the provision of a very simple structure for the purpose set forth and one which is economical from the manufacturing, installation and servicing standpoints.

Other objects of the invention including desirable details of construction and combinations of parts will become apparent from the following detailed description of a preferred embodiment of our invention, taken in conjunction with the accompanying drawings, in which:

Figure 1 is a diagrammatic view, disclosing our novel clutch actuating mechanism, together with the clutch and internal combustion engine cooperating therewith;

Figure 1a discloses in section the check valve of Figure 1;

Figure 2 is a detailed view of the yieldable connection between the power actuator and the controlled mechanism;

Figure 3 discloses the control valve in detail, with the parts in complete clutch engaging position;

Figure 4 discloses the valve parts in their clutch disengaging position;

Figure 5 discloses the valve parts during the reengagement of the clutch, just as the clutch is taking hold; and Figures 6 and 7 disclose modified forms of yieldable connections between the motor and clutch pedal.

In the embodiment of our invention selected for illustration there is diagrammatically disclosed in Figure 1 a conventional clutch mechanism 10 including a spring 11, said mechanism having the usual manually operated clutch release lever 12. The clutch lever is adapted to be power actuated to engage and disengage the clutch mechanism by a fluid motor 14, the latter being controlled by a manually actuated valve mechanism 16 which controls the prime mover function of the internal combustion engine 18 as a means for energizing the fluid motor. The connection between the motor and the clutch lever, together with the mode of operation of the motor, mutually cooperate in effecting a graduated and smooth clutch engagement, all of which is described in detail hereinafter.

The casing of the fluid motor 14 is preferably pivotally secured at 15 to the engine case and is also closed at both ends to receive a reciprocable piston 20. The connecting rod of the piston is pivotally secured at 22 to the clutch lever intermediate its fulcrum 24 and the pedal pad 26.

According to an important feature of the invention, the connection between the piston 20 and the clutch lever is made yieldable to provide for a graduated and smooth clutch engagement. As disclosed in detail in Figure 2, the connecting rod is divided into two parts 28 and 30, the former having a two-part cylindrical casing member 32 secured to its end and the latter at its end being provided with an adjustably mounted piston-like plate 34. Spring 36 is interposed between the plate 34 and one end wall of the cylinder, which spring is automatically compressed and expanded during the clutch disengaging and engaging movements of the piston 20. These parts may also be arranged to automatically elongate and contract the spring 36 to obtain the same function. To this end the yieldable connection may be designed as disclosed in Figure 6 wherein a spring 37 is normally compressed between a casing 38 and a fixed stop 39, the casing being flexibly connected to a sheave 40 in rolling engagement with a flexible member 41 connected at its ends to the clutch pedal and motor piston; also, as disclosed in Figure 7, a normally tensioned spring 42 may be connected at its ends to a fixed member 43 and to a flexible connection 44, the latter interconnecting the lever and motor piston.

The fluid motor 14 is adapted to be energized and deenergized by differentials of fluid pressure set up therein, the valve of Figures 3, 4 and 5 serving to control such pressures. This valve 16 preferably comprises a double-ended cylindrical casing 38', suitably secured to a chassis part, one side of the casing being provided with ports 45 and 46 connected respectively, by conduits 45' and 46' with the opposite ends of the motor casing, all as disclosed in Figure 1. Atmospheric inlets 48 are provided adjacent one end of the casing and a cylindrical projection 50, extending outwardly from the opposite end wall of the casing, completes the casing construction. The projection 50 is adapted to receive a conduit 51, the latter being connected to the manifold 52 of the internal combustion engine between the cylinders and the throttle valve 53 thereof. If desired, a check valve 54 may be placed in this connection for a purpose to be described hereinafter.

The valve mechanism is completed by spaced apart pistons 56 and 58 rigidly mounted on a common valve actuating rod 60, the latter extending through one end wall of the valve cylinder and pivotally connected at its end to a manually operated pedal lever member 62 mounted in the floor board adjacent the clutch lever. A return spring 64 may be provided to facilitate the control of the valve by its load on the pedal 62. The pistons or cup valve members 56 and 58 may be formed of leather cup members 66 supported on either side by metal discs 67 and the member 56 is also preferably provided with a cork washer member 68 adapted to abut the end wall of the cylinder (Figure 3) to form an air-tight seal. A spring member 70 may be positioned in the projection 50 and is normally compressed by the valve member 56, the latter being held in engagement with the end wall (Figure 3) by the action of the pressure differential existing between the vacuum side of valve member 56 and the atmospheric side of valve member 58, the opposite sides of these valves being subjected to the same pressure.

In describing the operation of the mechanism it is to be noted that the valve parts are normally in the position of Figure 3, the clutch being at that time engaged. To disengage the clutch the operator depresses the valve control lever 62 advancing the cup valve members to the right until the position indicated in Figure 4 is attained. The forward part of the motor cylinder is then connected with the vacuum producing intake manifold of the internal combustion engine, and with closed throttle, a vacuum of some twenty inches of mercury is usually created in this member. The air in the forward compartment of the fluid motor is thus evacuated while the rear compartment is vented to the atmosphere creating pressure differentials acting on the piston 20 to move the latter to the left and disengage the clutch. During this movement the spring 36 is compressed being weaker than clutch spring 11.

It will be observed that as the valve members 20 are manually moved to the right, the thrust of the compressed spring 70 is progressively reduced, thereby automatically and progressively increasing the manual effort necessary to actuate the valve pedal 62. This loaded condition exists by virtue of the pressure differentials acting at all times on the valves 56 and 58. This effect on the pedal reaches a maximum just as the port 45 is uncovered to disengage the clutch; therefore, the driver is apprised of the time of disengagement of the clutch plates. The casing is preferably made long enough to provide sufficient throw of a clutch pedal 62 to simulate manual operation of the clutch, that is after there has been sufficient movement to operate the valves to permit the disengagement of the clutch plates the piston 58 has sufficient longitudinal movement left to permit the operator to fully depress the pedal. This reaction accurately simulates that of a conventional clutch pedal during the usual manual release operation of the clutch, which is of course the effect desired.

The clutch having now been disengaged for gear shift or other reasons such as the coasting or "free wheeling" effect and the operator wishing to quickly re-engage the clutch, he releases the pressure of his foot on the pedal 62 permitting the valve pistons to move to the left under the action of the vacuum and spring 64 until the ports 45 and 46 are in communication and closed, respectively, to vacuum and atmosphere as disclosed in Figure 3. This permits the air in the rearward compartment of the servo motor to be drawn into the forward compartment tending to equalize the pressures acting on the piston 20, which flow of air is further accelerated as long as the clutch spring 11 is effective in moving the piston 20. By this construction the movement of the piston is accelerated as the air displaced by the piston is exhausted into the sub-atmospheric portion of the cylinder forward of the piston, and an equalization of pressures on opposite sides of the piston may be obtained at pressures below atmospheric pressure.

A complete equalization of pressures does not exist as long as the piston is moving rearwardly; however, the elapsed time in the rearward movement of the piston is minimized by connecting the ends of the cylinder with each other rather than with the atmosphere. Spring 36 is under compression until the clutch plates make contact for engagement. The full load of the clutch spring 11 is, however, not effective upon the clutch until the spring 36 has been fully expanded, the time interval of this operation being represented by the time it takes the spring 36 to expand under the drag of the piston 20. The engagement of the clutch is therefore a graduated one, and can be varied at will by increasing or decreasing the tension of the spring 36 by adjusting the plate 34 in the yieldable connection. The double-ended motor thus effects a very quick clutch engagement, which quick engagement, however, effectively cooperates with the particular buffing action of the yieldable connection to insure the desired "easing in" of the clutch to obviate clutch grabbing and engine stalling.

A structure is thus provided which gives an automatic and graduated clutch engagement simulating the usual manual "easing in" of the clutch. It is also of note that this automatic action provides for an effective clutch engagement after the third or fourth gear shifts in the high speed cars of the day. However, should there be a slight lag in the engagement, due to the effect of the spring 36 and resulting in a slipping of the clutch at the higher speeds, this effect is offset by the aforementioned quick or accelerated movement of the piston 20 obtained by equalizing pressures below atmospheric in the fluid motor. This minimizes the total elapsed time of piston movement, which time is materially lower than that which would otherwise be required were both sides of the fluid motor to be filled with air at atmospheric pressure. When the clutch engages the cylinder may be below atmospheric pressure, but the cup of valve member 58 as disclosed in Figures 2, 4 and 5 permits an air leak at this point to ultimately give atmospheric pressure in the fluid motor.

During the clutch engaging movement of the valve members 56 and 58, it is to be noted that the reaction on the foot is maximum until the valve engages spring 70, at which time the ports 45 and 46 are placed in communication, and progressively decreases thereafter exactly as with the conventional manual clutch control. Immediately after the ports 45 and 46 are placed in communication, the driver senses the clutch engagement at this point, by the released pressure on the foot cautioning him to retard movement of pedal, and as the spring 70 is compressed the aforementioned progressively decreasing release effort becomes effective. The spring 70 is of course of insufficient strength to move the valves with the pedal 62 released and the vacuum at a maximum. The spring is therefore normally compressed as shown in Figure 3.

With the construction described, the reaction to the operation of the small clutch control pedal 62 is substantially the same as that sensed during an unaided manual operation of the conventional clutch pedal 12. The physical effort of lifting the foot from the floor board necessary to operate the conventional lever 12 is also eliminated, and the degree of force necessary to actuate the pedal 62 is made sufficiently low to provide a substantially effortless actuation of the heaviest clutch springs.

The valve mechanism, as shown, is connected directly to the suction passage of the engine, and under these conditions the clutch will tend to engage as the accelerator of the vehicle is depressed to increase the power of the motor, which increased power is automatically accompanied by a reduction of vacuum in the intake manifold. This results in an involuntary and automatic engagement of the clutch as the motor is accelerated, which operation may be desirable. However, should this operation not meet with approval, the check valve 54 may be interposed in the connection between the valve mechanism and the manifold, so that once the clutch has been disengaged by the fluid motor, it will be held out of engagement until the controlling valve 16 is released, regardless of the extent to which the accelerator is depressed. The check valve 54 also nullifies the effect of a supercharger, if such an engine adjunct is employed.

It is also to be noted as disclosed, the usual clutch lever 12 is purposely left intact so that if, for any reason, the power fails, the clutch may be operated in the usual fashion, the ends of the motor cylinder being interconnected, insuring an unimpeded movement of the pedal.

A very simple and economical power operated clutch mechanism is thus produced, the mechanism being substantially fool-proof for if the foot were accidentally or otherwise removed from the valve pedal control, the spring 36 would automatically time the clutch engagement and effect a smooth operation. On the other hand, the spring 36 may be omitted and the clutch operated by the "feel" of the valve 16. In this case, the desired slow or graduated engagement of the clutch is effected by checking the rearward movement of the foot as the pressures on the foot are reduced. It follows therefore, that our novel type of valve need not necessarily be employed when and if the spring 36 is incorporated. However, we prefer the combination illustrated.

It is also apparent that a quick but nevertheless buffed clutch engagement may be had wholly through the medium of the distribution or shifting of the air in the fluid motor, and that this action is particularly effective when all manual control of the valve is dispensed with and the foot pressure relieved from the valve pedal to effect the clutch engagement. Considering this phase of the operation, the spring 70 may be eliminated from the housing 50.

While we have illustrated and described somewhat in detail one embodiment of our invention, it is not our intention to limit the scope of the invention to this particular embodiment or otherwise than by the terms of the appended claims.

We claim:

1. The combination with a movable member having a retractive tendency, of a double-ended fluid motor, a piston in said motor operatively connected to said movable member, said piston being normally subjected on both of its faces to atmospheric pressure, valve means for controlling said motor to evacuate the fluid from one side of said piston to establish pressure differentials in said motor and effect a movement of said piston and its connected movable member, said valve means also being operative to control said motor to distribute the fluid within the motor, to thereby destroy the existing pressure differential, said fluid when distributed exerting a sub-atmospheric pressure, whereby a controlled and predetermined retractive movement of said movable member is effected.

2. The combination with a movable member having a retractive tendency, of a double-ended fluid motor, a piston in said motor operatively connected to said movable member, said piston being normally subjected on both of its faces to atmospheric pressure, means for evacuating the fluid from one side of said piston to establish pressure differentials in said motor and effect a movement of said piston and its connected movable member, said means also including a double-ported two-part slide valve structure operative to effect the aforementioned evacuating action and further operative to equally distribute the fluid within the motor to destroy the ultimate pressure differential created by said pump, said fluid immediately after distribution, and during the distribution, exerting a sub-atmospheric pressure, whereby a controlled and predetermined retractive movement of said movable member is effected.

3. In an automotive control device, the combination with a clutch operating member and an internal combustion engine, provided with an intake manifold, of a double-ended servo motor, a reciprocable piston member in said motor, a connection between said piston member and clutch operating member, valve means for said motor, fluid transmitting connections between said valve and motor, other fluid transmitting connections between said valve and manifold, said valve means comprising a fixed casing member provided with atmospheric ports and with ports receiving the aforementioned connections with the motor, and further comprising a movable member, said valve being operative to successively energize and de-energize said motor by first connecting that compartment of said motor between one of its ends and the piston member with the manifold and simultaneously venting the remaining compartment and subsequently cutting off the connection between the manifold and motor and interconnecting both motor compartments without, however, connecting the same to sources of higher or lower pressure.

4. In an automotive control device, the combination with a clutch operating member and an internal combustion engine, provided with an intake manifold, of a double-ended servo motor, a reciprocable piston member in said motor, a connection between said piston member and clutch operating member, valve control means for said motor, connections between said valve and motor and other connections between said valve and manifold, said valve means comprising a plurality of pistons constructed and arranged to successively evacuate one end of said motor through the intermediary of the intake manifold of the engine and then interconnect both ends of the motor to establish an equilibrium of pressures throughout the motor by passing the air from the higher pressure side of said motor to the evacuating side.

5. Power operating mechanism comprising in combination with means for inducing a vacuum and means for operating a valve for said mechanism, a valve comprising, a double-ended cylinder, motor communicating ports intermediate the ends of said cylinder, a port adjacent one end of said cylinder placing the same in communication with the atmosphere and a port in the opposite end placing the same in communication with said vacuum inducing means together with reciprocable valve elements mounted for joint operation, said elements being normally positioned to place said first mentioned ports in communication and uncover said atmospheric port.

6. Valve mechanism comprising in combination with means for inducing a vacuum and means for operating the mechanism, a double-ended cylinder provided with a plurality of openings constituting ports to receive connections from a fluid motor, and further provided with a port in one end of the cylinder adapted to receive a connection with the vacuum source, and with other atmospheric or venting ports adjacent the other end of the cylinder, together with reciprocable valve elements mounted on a common valve operating means, said elements being normally positioned to place said first mentioned ports in communication and uncover said atmospheric port, together with means acting on one of said valve elements tending, when the valve is inactive, to actuate the same.

7. Valve mechanism comprising in combination with means for inducing a vacuum and means for operating the mechanism, a double-ended cylinder, a port adjacent one end of said cylinder placing the same in communication with the atmosphere, and a port in the opposite end placing the same in communication with the vacuum inducing means, two motor communicating ports intermediate said ports together with reciprocable valve elements mounted on a common valve operating means, said elements adapted to position at least one of said operating ports in communication with said atmospheric port to thereby place one end of said cylinder in communication with the atmosphere, together with a normally compressed yieldable means acting on one of said valve elements tending, when the valve is inactive, to actuate the same, said means being constructed and arranged to become progressively inactive as the valve elements are actuated to render the valve mechanism operative.

8. In a valve structure, the combination with induction means and valve actuating connections, of a double-ended valve casing, said casing provided with ports intermediate its ends, connected valve members slidable within said casing, said members, with the valve inactive, positioned so as to intercommunicate said ports, means connecting said induction means with one end of said valve casing whereby one face of one of said valve members is constantly subjected to a sub-atmospheric pressure tending to move the valve members laterally.

9. In a valve structure, the combination with induction means and valve actuating connections, of a double-ended valve casing, said casing provided with ports intermediate its ends, connected valve members slidable within said casing, said members, with the valve inactive, positioned so as to intercommunicate said ports, means connecting said induction means with one end of said valve casing whereby one face of one of said valve members is constantly subjected to a sub-atmospheric pressure tending to move the valve members laterally, together with means acting on said valve members tending to displace the same laterally in opposition to the force exerted on said valve members by virtue of the action of said induction means.

10. In an automotive control device, in combination with a movable member to be actuated having a retractive tendency, a double-ended fluid motor having a piston element movable therein, a connection between said piston element and said movable member, and a valve mechanism for rendering said fluid motor operative to move said piston and actuate said movable member, said valve mechanism having a part movable to one position to permit evacuation of one side of said motor between one end of its cylinder and the aforementioned piston, said valve part being movable to a second position to intercommunicate both ends of said motor to re-establish an equality of fluid pressure on both sides of said piston and thereby permit the retractable movement of said movable member in a predetermined fashion.

11. In an automotive vehicle provided with a clutch and an internal combustion engine, clutch operating mechanism comprising a vacuum operated fluid motor operatively connected with the clutch, a valve for controlling the operation of said fluid motor, fluid transmitting connections interconnecting the intake manifold of the internal combustion engine, the motor and the valve, and manually operable means for operating the valve, said valve comprising a casing member, a movable piston member and means within the casing member adapted to either progressively increase or decrease the loading of the manually operable means as the valve is operated to operate the clutch.

12. In an automotive vehicle provided with a clutch and an internal combustion engine, clutch operating mechanism comprising a double-ended fluid motor, connections between the movable element of said motor and the clutch mechanism, a double-ended valve member, a connection between one end of said motor and one end of said valve, and a second connection between the other end of the motor and the other end of the valve, a fluid transmitting connection interconnecting said valve with the manifold of the internal combustion engine, manually operable means for operating said valve, the latter comprising a movable element adapted to selectively intercommunicate the manifold with one end of the fluid motor or intercommunicate both ends of the fluid motor with each other.

13. In an automotive vehicle provided with a clutch and an internal combustion engine, a double-ended fluid motor, an operative connection between said motor and clutch, said connection including a spring in series in said connection, a valve means for controlling the operation of said motor by successively connecting said motor with the engine and then interconnecting the two sides of said motor with each other, and manually operable means independent of said clutch mechanism for operating said valve.

14. In an automotive vehicle provided with a clutch mechanism and an internal combustion engine, a double-ended fluid motor operatively connected with said clutch mechanism, said connection including a spring in series in said connection, a double-ended valve means including a reciprocable piston member, said valve being constructed to successively evacuate one compartment of the motor to disengage the clutch and thereafter by-passing atmosphere to said compartment from the remaining compartment to thereby effect a reengagement of the clutch, fluid transmitting connections between said valve and internal combustion engine and other fluid transmitting connections between said valve and motor, and manually operable means for operating said valve.

15. Power actuating mechanism for a clutch lever comprising the combination with an internal combustion engine constituting a means for providing a vacuum, of a fluid motor having a piston element connected to the clutch lever to actuate the same, a valve for rendering said motor operative, said valve comprising a valve casing and a movable valve member, manually operative means for operating said movable valve member, fluid transmitting connections between said valve and internal combustion engine, fluid transmitting connections between said valve and motor, the movable valve member of said valve being so constructed and arranged as to provide a reacting force upon the means for actuating the same, said reacting force being, in part, derived from the operation of the fluid motor in actuating said clutch lever, and a spring interposed between a fixed abutment and said movable valve member, said spring functioning to modify the reacting force of said movable valve member upon the manually operated valve operating means.

16. In combination with an engine and driving connections therefrom including a friction clutch and yielding means tending to set the clutch, a motor operative to react against said yielding means and effect complete release of the clutch and being connected to the operating mechanism of the clutch by means of an elastic connection which will yield under action of the clutch releasing motor and thereby render releasing and setting of the clutch gradual and smooth.

17. In a vehicle, the combination with an internal combustion engine having an intake and driving connections including a friction clutch and yielding means tending to set the clutch, a suction motor operated by suction from the engine intake, said motor being connected to react against said yielding clutch setting means and being operatively arranged to effect complete release of the clutch and the operating connection therebetween and said clutch being elastic so that it will yield under action of the suction motor to effect smooth disengaging and setting of the clutch.

CALEB S. BRAGG.
VICTOR W. KLIESRATH.